US011373499B2

(12) United States Patent
Sawada et al.

(10) Patent No.: US 11,373,499 B2
(45) Date of Patent: Jun. 28, 2022

(54) RESCUE SYSTEM AND RESCUE METHOD, AND SERVER USED FOR RESCUE SYSTEM AND RESCUE METHOD

(71) Applicant: TOYOTA JIDOSHA KABUSHIKI KAISHA, Toyota (JP)

(72) Inventors: Hiroki Sawada, Toyota (JP); Masato Tamaoki, Iwakura (JP); Eisuke Ando, Nagoya (JP); Masato Endo, Nagakute (JP); Kuniaki Hasegawa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/189,395

(22) Filed: Nov. 13, 2018

(65) Prior Publication Data

US 2019/0147720 A1 May 16, 2019

(30) Foreign Application Priority Data

Nov. 13, 2017 (JP) .............................. JP2017-218373

(51) Int. Cl.
*G08B 21/02* (2006.01)
*H04N 7/18* (2006.01)
(Continued)

(52) U.S. Cl.
CPC ......... *G08B 21/0266* (2013.01); *G06V 20/56* (2022.01); *G06V 40/10* (2022.01);
(Continued)

(58) Field of Classification Search
CPC ...... H04N 7/181; H04W 4/029; H04W 12/06; H04W 4/046; H04W 12/08; H04W 4/90;
(Continued)

(56) References Cited

U.S. PATENT DOCUMENTS 7,916,066 B1 * 3/2011 Osterweil ............. A61B 5/1117
342/28
8,086,351 B2  12/2011 Gaudiano et al.
(Continued)

FOREIGN PATENT DOCUMENTS

CN  1798335 A  7/2006
CN  103426211 A  12/2013
(Continued)

OTHER PUBLICATIONS

United States Patent and Trademark Office, Non-Final Office Action issued to U.S. Appl. No. 16/189,092 dated Aug. 15, 2019, 31 pages.
(Continued)

*Primary Examiner* — Farhan Mahmud
(74) *Attorney, Agent, or Firm* — Hunton Andrews Kurth LLP

(57) ABSTRACT

A rescue system identifies and rescues a protection target, using information from a camera. The rescue system includes: a plurality of movable bodies each equipped with a camera; and a server configured to communicate with the plurality of movable bodies. The server is configured to (a) identify the protection target, using movable-body information from the plurality of movable bodies, and (b) provide a protector of the protection target with notification about positional information on the protection target, when the protection target is identified and a position where the protection target is detected is out of a predetermined range.

8 Claims, 4 Drawing Sheets

(51) Int. Cl.
  *G08B 13/196* (2006.01)
  *G08B 25/08* (2006.01)
  *G06V 20/56* (2022.01)
  *G06V 40/10* (2022.01)

(52) U.S. Cl.
  CPC . *G08B 13/19602* (2013.01); *G08B 13/19654* (2013.01); *G08B 25/08* (2013.01); *H04N 7/181* (2013.01)

(58) Field of Classification Search
  CPC .......... H04W 4/40; H04L 67/12; G07C 5/008; G01C 21/26; G01C 21/3647; G06F 3/017; G06F 3/04842; G06Q 30/02; G08G 1/096775; G08G 1/205; B60R 25/102; G08B 25/016
  See application file for complete search history.

(56) References Cited

U.S. PATENT DOCUMENTS

| | | | |
|---|---|---|---|
| 9,471,059 B1 | 10/2016 | Wilkins | |
| 9,826,415 B1 | 11/2017 | Byrne | |
| 10,155,587 B1 | 12/2018 | Tang | |
| 10,395,332 B1 | 8/2019 | Konrardy et al. | |
| 2002/0156646 A1 | 10/2002 | Kaiwa et al. | |
| 2004/0233414 A1 | 11/2004 | Jamieson et al. | |
| 2006/0066723 A1 | 3/2006 | Iwase et al. | |
| 2006/0152592 A1 | 7/2006 | Chishima et al. | |
| 2006/0184323 A1 | 8/2006 | Park | |
| 2006/0187027 A1 | 8/2006 | Smith | |
| 2007/0205937 A1 | 9/2007 | Thompson et al. | |
| 2008/0077322 A1 | 3/2008 | Sumizawa | |
| 2009/0204600 A1 | 8/2009 | Kalik et al. | |
| 2010/0198514 A1 | 8/2010 | Miralles | |
| 2010/0262367 A1 | 10/2010 | Riggins et al. | |
| 2011/0066368 A1 | 3/2011 | Koyasu et al. | |
| 2012/0316768 A1 | 12/2012 | Haran | |
| 2013/0002869 A1 | 1/2013 | Yuasa et al. | |
| 2013/0178185 A1 | 7/2013 | Park et al. | |
| 2013/0194421 A1 | 8/2013 | Kita | |
| 2013/0217332 A1 | 8/2013 | Altman et al. | |
| 2014/0111332 A1 | 4/2014 | Przybylko et al. | |
| 2014/0133656 A1 | 5/2014 | Wurster et al. | |
| 2014/0167954 A1 | 6/2014 | Johnson et al. | |
| 2014/0263615 A1* | 9/2014 | Deangelo | G07D 7/0043 235/375 |
| 2014/0309866 A1 | 10/2014 | Ricci | |
| 2014/0353422 A1 | 12/2014 | Westbrook, Sr. | |
| 2015/0066248 A1 | 3/2015 | Arbeit et al. | |
| 2015/0194034 A1 | 7/2015 | Shim et al. | |
| 2016/0340006 A1 | 11/2016 | Tang | |
| 2017/0034682 A1 | 2/2017 | Matsumasa et al. | |
| 2017/0041743 A1 | 2/2017 | Artzt et al. | |
| 2017/0092109 A1 | 3/2017 | Trundle et al. | |
| 2017/0131727 A1 | 5/2017 | Kurdi et al. | |
| 2017/0191843 A1 | 7/2017 | Yadav | |
| 2017/0249846 A1 | 8/2017 | Ignaczak et al. | |
| 2017/0301109 A1 | 10/2017 | Chan et al. | |
| 2017/0364733 A1 | 12/2017 | Estrada et al. | |
| 2018/0039262 A1 | 2/2018 | Fox et al. | |
| 2018/0050800 A1 | 2/2018 | Boykin et al. | |
| 2018/0068546 A1 | 3/2018 | Fujimoto | |
| 2018/0082560 A1 | 3/2018 | Gillum et al. | |
| 2018/0096579 A1* | 4/2018 | Komatsu | G06K 7/10 |
| 2018/0128894 A1 | 5/2018 | Kaio | |
| 2018/0249127 A1 | 8/2018 | Sielski et al. | |
| 2018/0300964 A1* | 10/2018 | Lakshamanan | G07C 5/008 |
| 2019/0057252 A1 | 2/2019 | Ichihara et al. | |
| 2019/0086914 A1 | 3/2019 | Yen et al. | |
| 2019/0141948 A1 | 5/2019 | Sawada et al. | |
| 2019/0147252 A1 | 5/2019 | Sawada et al. | |
| 2019/0147723 A1 | 5/2019 | Sawada et al. | |

FOREIGN PATENT DOCUMENTS

| | | |
|---|---|---|
| CN | 103956059 A | 7/2014 |
| CN | 107170195 A | 9/2017 |
| CN | 207218924 U | 4/2018 |
| JP | H09-220266 A | 8/1997 |
| JP | 2000099971 A | 4/2000 |
| JP | 2003109156 A | 4/2003 |
| JP | 2005038299 A | 2/2005 |
| JP | 2005-092727 A | 4/2005 |
| JP | 2006086591 A | 3/2006 |
| JP | 2009064222 A | 3/2009 |
| JP | 2013-157019 A | 8/2013 |
| JP | 2015-111906 A | 6/2015 |
| JP | 2016036123 A | 3/2016 |
| JP | 2016119625 A | 6/2016 |
| JP | 2016-218865 A | 12/2016 |
| JP | 2017027107 A | 2/2017 |
| JP | 2017126967 A | 7/2017 |
| JP | 2017163511 A | 9/2017 |
| JP | 2019091161 A | 6/2019 |
| KR | 20160026437 A | 3/2016 |
| KR | 1020170100892 A | 9/2017 |
| SG | 195504 A1 | 12/2013 |
| WO | 2016132492 A1 | 8/2016 |
| WO | 2016162899 A1 | 10/2016 |
| WO | 2017119505 A1 | 7/2017 |
| WO | 2017154595 A1 | 9/2017 |
| WO | 2017159680 A1 | 9/2017 |

OTHER PUBLICATIONS

United States Patent and Trademark Office, Final Office Action issued to U.S. Appl. No. 16/189,092 dated Jun. 30, 2020, 49 pages.

United States Patent and Trademark Office, Non-Final Office Action issued to U.S. Appl. No. 16/189,092 dated Nov. 17, 2020, 39 pages.

Notice Of Allowance, United States Patent and Trademark Office, issued to U.S. Appl. No. 16/189,092 dated Mar. 10, 2021, 20 pages.

Corrected Notice Of Allowance, United States Patent and Trademark Office, issued to U.S. Appl. No. 16/189,092 dated Mar. 29, 2021, 6 pages.

Corrected Notice of Allowability, United States Patent and Trademark Office, issued to U.S. Appl. No. 16/189,092 dated May 26, 2021, 6 pages.

Corrected Notice of Allowability, United States Patent and Trademark Office, issued to U.S. Appl. No. 16/189,092 dated Jun. 3, 2021, 6 pages.

Corrected Notice Of Allowability, United States Patent and Trademark Office, issued to U.S. Appl. No. 16/189,092 dated Apr. 8, 2021, 6 pages.

Corrected Notice of Allowance, United States Patent and Trademark Office, issued to U.S. Appl. No. 16/189,092 dated Jul. 29, 2021, 6 pages.

* cited by examiner

RESCUE SYSTEM AND RESCUE METHOD, AND SERVER USED FOR RESCUE SYSTEM AND RESCUE METHOD

This nonprovisional application is based on Japanese Patent Application No. 2017-218373 filed on Nov. 13, 2017 with the Japan Patent Office, the entire contents of which are hereby incorporated by reference.

BACKGROUND

Field

The present disclosure relates to a rescue system and a rescue method as well as a server used for the rescue system and the rescue method, and more particularly relates to a system using a vehicle to detect a person to be protected (protection target) who is staying out, so as to protect the person.

Description of the Background Art

A system for searching for an elderly person or lost child for example has been known. For example, Japanese Patent Laying-Open No. 2015-111906 discloses a search system for determining whether a person whose image is captured by a camera is a search target, based on images and/or video captured by a plurality of cameras connected to a network such as monitoring cameras installed on streets and moving cameras mounted on movable bodies like vehicles, and also based on text information derived from a name tag or the like shown on the images.

Japanese Patent Laying-Open No. 2016-218865 discloses a rescue system for identifying a user such as dementia patient based on a serial number on an accessory worn by the user. The serial number is read by a smart phone or the like of a finder of the user and transmitted to a data management company from the smart phone.

SUMMARY

It is assumed that a system as described above is used to watch children. Generally, children have relatively many opportunities to stay out for going to or back from school or playing with friends, for example, and therefore, there may be a high possibility that the children are detected by the system as described above. Accordingly, there is a possibility that notifications are given to protectors (parents) of the children and/or requests for rescue are made more than necessary.

The present disclosure is given to provide solutions to the above problems. An object of the present disclosure is to suppress excessive repetition of notification to a protector of a person to be protected (hereinafter referred to as "protection target") by a system for rescuing the protection target, based on image information from a camera mounted on a movable body.

A rescue system according to the present disclosure identifies and rescues a protection target, using information from a camera. The rescue system includes: a plurality of movable bodies each equipped with a camera; and a server configured to communicate with the plurality of movable bodies. The server is configured to (a) identify the protection target, using movable-body information from the plurality of movable bodies, and (b) provide a protector of the protection target with notification about positional information on the protection target, when the protection target is identified and a position where the protection target is detected is out of a predetermined range.

The rescue system according to the present disclosure provides the protector with notification that the protection target has been detected, when the protection target has been identified based on information from a camera mounted on a movable body (vehicle, for example) and the position where the protection target was detected is out of a predetermined range (usual range of activities of the protection target) specified in advance by a user. In other words, the notification is not given to the protector when the protection target was detected within the predetermined range. Accordingly, excessive repetition of the notification to the protector can be suppressed.

The protection target is a child. The server is configured to determine whether the protection target is attended by an accompanying person, based on image information included in the movable-body information. The server is configured to determine, when the protection target is attended by an accompanying person, whether the accompanying person is a child. The server is configured to provide the protector with the notification together with the image information on the accompanying person, regardless of the position where the protection target is detected, when the accompanying person is an adult and does not match a person registered in advance.

In the system thus configured, the notification is given to the protector regardless of the position where the protection target was detected, when the protection target is a child and the image used for identifying the child shows that the child is accompanied by an adult (who is not an acquaintance) other than a person registered in advance. If the accompanying person is an adult who is not an acquaintance, the accompanying person may be a suspicious person. Therefore, under such an emergency circumstance, the notification is given to the protector even when the protection target was found in the predetermined range. The protection target can accordingly be protected properly.

The server is configured to request a rescue group to rescue the protection target, when the protector instructs the server to protect the protection target in response to the notification provided to the protector.

The server is configured to arrange a vehicle for transporting the protection target, in response to an instruction from the protector to transport the protection target.

In the system thus configured, the protection target can be protected by a person in charge of the rescue group even when the protector cannot immediately rush to the protection target, for example.

A server according to another aspect of the present disclosure is used for a system for identifying a protection target, using information from a plurality of movable bodies each equipped with a camera. The server is configured to communicate with the plurality of movable bodies. The server is configured to (a) identify the protection target, using movable-body information from the plurality of movable bodies, and (b) provide a protector of the protection target with notification about positional information on the protection target, when the protection target is identified and a position where the protection target is detected is out of a predetermined range.

A method according to still another aspect of the present disclosure is a rescue method for identifying and rescuing a protection target, by a system including: a plurality of movable bodies each equipped with a camera; and a server configured to communicate with the plurality of movable bodies. The method includes: (a) identifying, by the server, the protection target using information acquired by the camera; and (b) providing a protector of the protection target with notification about positional information on the protection target, when the protection target is identified and a position where the protection target is detected is out of a predetermined range.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
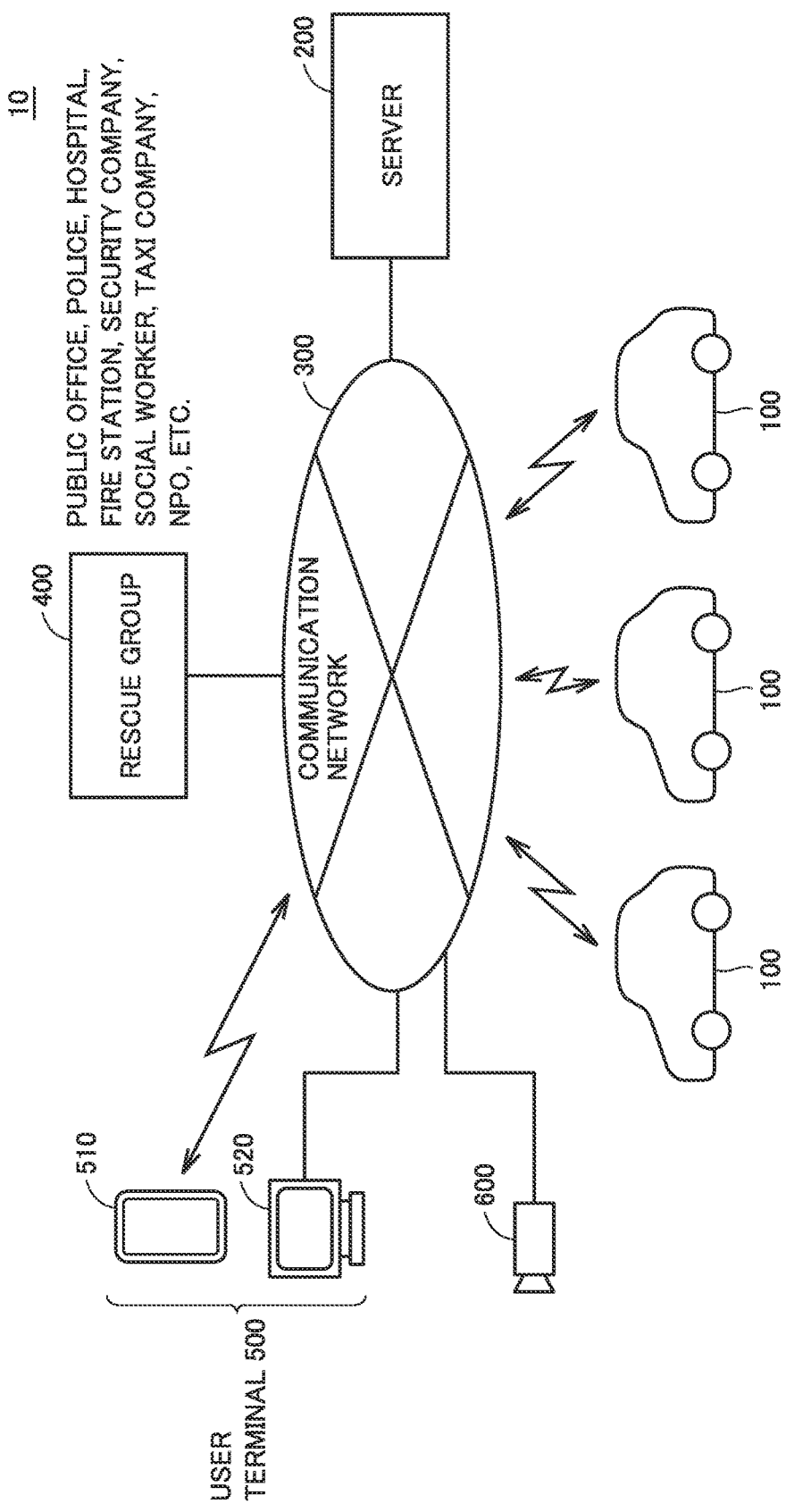
FIG. 1 is a schematic diagram of an overall configuration of a rescue system according to the present embodiment.

In the following, embodiments of the present disclosure are described in detail with reference to the drawings. In the drawings, the same or corresponding elements are denoted by the same reference characters, and a description thereof is not repeated.

First Embodiment

<System Overview>

FIG. 1 is a schematic diagram of an overall configuration of a rescue system 10 according to the present embodiment. Referring to FIG. 1, rescue system 10 includes a plurality of movable bodies 100 and a server 200 configured to communicate with movable bodies 100. Rescue system 10 identifies a child who is a search target (also referred to as "protection target" hereinafter), based on information acquired from movable bodies 100, and gives notification about the detected information to the family for example of the child. Rescue system 10 also rescues the identified child as required. Vehicle 100 and server 200 are configured to transmit/receive information to/from each other through a communication network 300 such as the Internet or telephone line, for example. Vehicle 100 and server 200 may directly communicate with each other without communication network 300.

Regarding the present embodiment, an example is described in which a vehicle is used as movable body 100, and movable body 100 is also referred to simply as "vehicle 100" hereinafter. Vehicle 100 includes automobile, motorcycle, bicycle, and the like.

A user (a protector of a child for example) manipulates a user terminal 500 such as a mobile terminal 510 like smart phone or a personal computer 520 at home to collect information about the child who is a protection target and register the information in server 200 in advance. Server 200 acquires information from cameras and/or a variety of sensors mounted on vehicles 100 located within a predetermined area or a stationary camera 600 installed on a street or shop, and identifies the protection target, using the acquired information and the registered information about the child.

Search by vehicle 100 is performed based on a request from a user (protector) when a child gets lost for example to eventually go missing. Even when no request to search for a specific child is made by a user, vehicle 100 may patrol based on a command from server 200.

When the child who is a protection target is identified, server 200 notifies the user of the information about the detected child through user terminal 500. Server 200 also requests a rescue group 400 to protect the identified child, at the request of the user or based on determination by server 200 itself. Rescue group 400 includes, for example, a public office such as city office or municipal office, a police, a fire station, a security company, a hospital, a hospice, a care house, an NPO (Non-Profitable Organization), and a public transportation facility such as taxi company, or local social worker. Alternatively, rescue group 400 may be a vehicle or a shop located around the location where the protection target is detected. Rescue group 400 receiving the request temporarily accepts the protection target until the arrival of the protector, or sends the protection target to the protection target's home.

<Configuration of Vehicle and Server>

Figure 2:
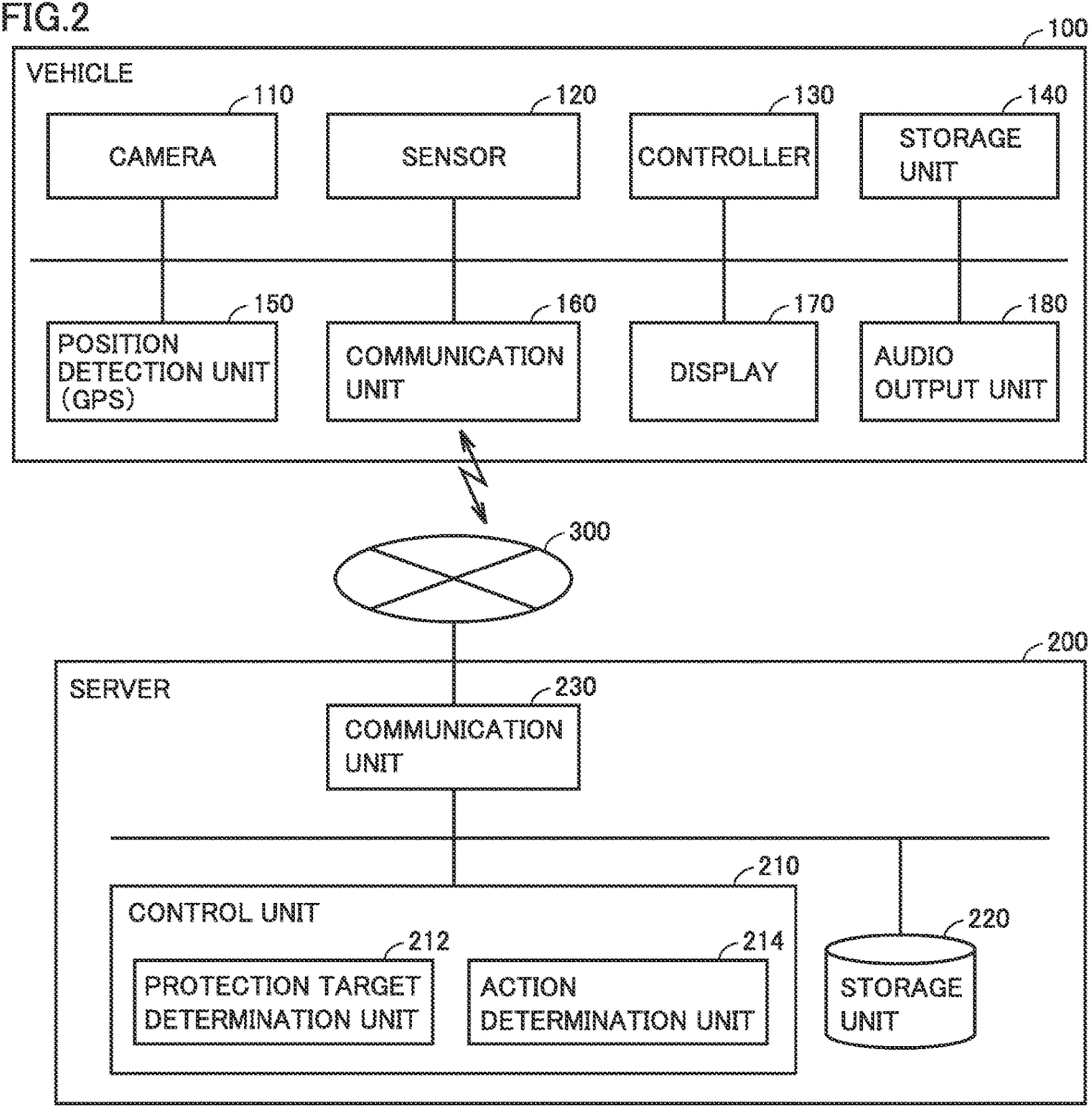
FIG. 2 is a block diagram for illustrating details of a vehicle and a server in FIG. 1.

FIG. 2 is a block diagram for illustrating details of vehicle 100 and server 200 in FIG. 1. Referring to FIG. 2, vehicle 100 includes a camera 110, a sensor 120, a controller 130, a storage unit 140, a position detection unit 150, a communication unit 160, a display 170, and an audio output unit 180.

Communication unit 160 is a communication interface between vehicle 100 and communication network 300. Vehicle 100 transmits/receives information to/from server 200 through communication unit 160.

Camera 110 is a CCD (Charge Coupled Device) camera, for example, and attached to a position from which an image of a region ahead of vehicle 100 can be captured. Camera 110 is mounted as a part of a drive recorder for recording images when vehicle 100 suffers an accident or the like, for example. The images captured by camera 110 are transmitted to server 200 through communication unit 160. The images are captured by camera 110 not only during running of vehicle 100 but also during parking of vehicle 100 at a parking area or the like.

Sensor 120 is a receiver for wirelessly detecting information stored on an ID tag or the like, or a reader for reading information from a barcode or QR Code® (two-dimensional barcode), for example. The information acquired by sensor 120 is transmitted to server 200 through communication unit 160 and used for identifying a protection target.

Position detection unit 150 is mounted for example on a navigation device (not shown) to acquire information about the absolute position of the vehicle on which this position detection unit 150 is mounted, by means of the GPS (Global Positioning System). Position detection unit 150 outputs the acquired positional information to server 200.

Display 170 is constructed for example of a liquid crystal panel to display various types of information acquired by vehicle 100 as well as information transmitted from server 200, for example. Display 170 is formed for example in a window of vehicle 100 and configured to provide information to those who are outside the vehicle (protection target, for example). Conversation through audio output unit 180 as well as display 170 like videophone, and communication by answering to a question indicated on display 170 through touch operation are also possible.

Controller 130 includes a CPU (Central Processing Unit), a storage such as memory, and an input/output buffer (they are not shown), to perform overall control of vehicle 100. Receiving from server 200 a command to search for a protection target, controller 130 acquires information from the detection device (camera 110 and/or sensor 120) and transmits the acquired information to server 200. When vehicle 100 is to identify the protection target, controller 130 stores in storage unit 140 information regarding the protection target which is transmitted from server 200, and compares the information acquired from the detection device with the information stored in storage unit 140 to identify the protection target.

Server 200 includes a control unit 210, a storage unit 220, and a communication unit 230. Control unit 210 includes a protection target determination unit 212, and an action determination unit 214.

Communication unit 230 is a communication interface between server 200 and communication network 300. Server 200 transmits/receives information to/from vehicle 100 and rescue group 400 for example through communication unit 230.

Storage unit 220 stores in advance information about characteristics of a protection target for identifying the protection target. The characteristics used for identifying the protection target include text information such as the name, the address, and the phone number of the protection target, image information such as a photograph of the face of the protection target, characteristics of favorite clothing and belongings (hat/cap, gloves, shoes, bag, and the like) often worn by the protection target, or information about characteristic behavioral patterns of the protection target such as the manner of walking and body language.

Protection target determination unit 212 included in control unit 210 receives image information acquired by camera 110 of vehicle 100 and/or information acquired by sensor 120. Protection target determination unit 212 analyzes the image information from camera 110 to detect characteristics of the face, clothing, and belongings of any person (candidate) included in the image and extract text information included in the image. Protection target determination unit 212 compares these pieces of information with the information stored in storage unit 220 to determine whether the candidate whose image was captured is the protection target. Protection target determination unit 212 may also compare the ID information extracted by sensor 120 with the information stored in storage unit 220 to identify the protection target. It may also extract, from the image (video image) from camera 110, behavioral patterns of the candidate by big data analysis, so as to identify the protection target.

Action determination unit 214 determines what action is to be taken, when protection target determination unit 212 identifies the protection target. Specifically, action determination unit 214 determines whether to inform the protector of the fact that the protection target has been found, and determines whether to make a rescue request to a rescue group, in accordance with standards stored in storage unit 220.

Generally, children have relatively many opportunities to stay out for going to or back from school or playing with friends, for example. Therefore, there may be a high possibility that the children are detected by the aforementioned system performing watching and protection of the children. Accordingly, to a protector of the child identified as a protection target, notification that the child has been found may be given frequently from the server, even under the situation where the protection is not necessary.

In view of the above, the first embodiment employs the following scheme. Specifically, when a child is identified as a protection target and the child is found within the usual range of activities of the child, the notification that the child has been found is not given to the protector so as to suppress excessive repetition of the notification to the protector.

<Description of Control Details>

Figure 3:
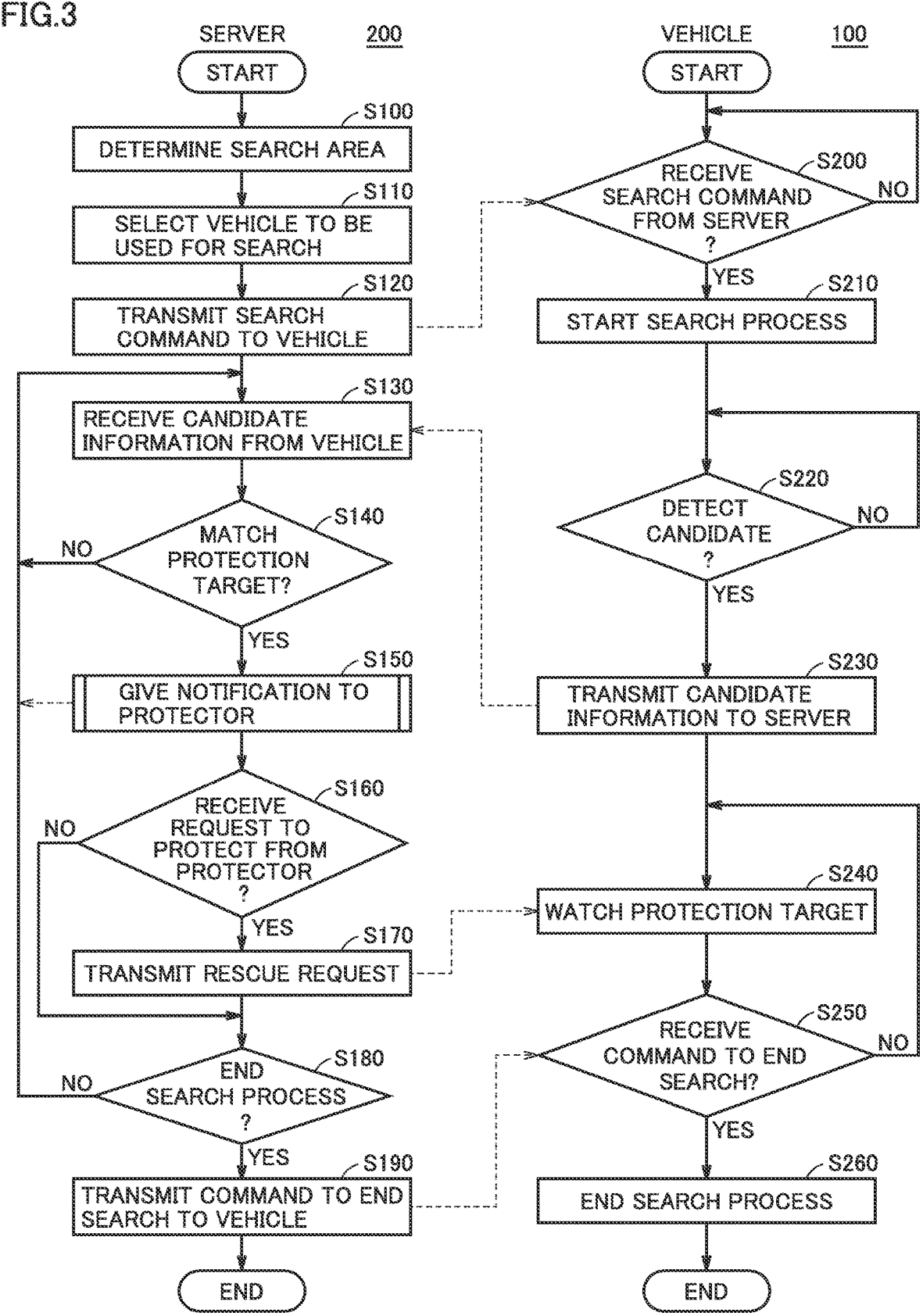
FIG. 3 is a flowchart for illustrating details of control executed by a vehicle and a server for a rescue system according to the present embodiment.

FIG. 3 is a flowchart for illustrating details of control executed by vehicle 100 and server 200 in rescue system 10 according to the first embodiment. Each of the flowcharts shown in FIG. 3 and FIGS. 4 and 5 described later herein is executed by calling a program stored in controller 130 of vehicle 100 and control unit 210 of server 200 from a main routine in a predetermined cycle or when a predetermined condition is met. Alternatively, a part or all of the steps in each flowchart may be performed by dedicated hardware (electronic circuit).

Referring to FIG. 3, a process performed by server 200 is described first. Server 200 defines a search area to be searched for a protection target in step (hereinafter step is abbreviated as S) 100. The search area is preferably defined based on the usual range of activities of the protection target. The search area may be defined, when a user makes a request to search for the protection target for example, based on the address of the protection target, such as an area of 20 km from the protection target's home, for example, or the search area may be within a range designated by a requester. When no request to search is made by the user, a predetermined range of execution of patrol is defined as a search area.

In S110, server 200 acquires positional information on a plurality of vehicles through communication network 300. From among vehicles located within the defined search area, at least one vehicle is selected to be used for the search for the protection target. In S120, server 200 outputs a search command to selected vehicle 100 to search for the protection target. Although not shown in the flowchart, if the selected vehicle moves to go out of the search area or a new vehicle enters the search area, the vehicle to be used for search may be changed as appropriate. Alternatively, no specific vehicle may be selected and the search command may be broadcasted to vehicles located in the defined search area.

Acquiring candidate information from selected vehicle 100 to which the search command is output (S130), server 200 determines whether the candidate is identified as the protection target requested by the user. When patrol is performed, server 200 determines whether the candidate is included in a list of protection targets registered in storage unit 220, based on the information acquired from vehicle 100 (S140).

When the candidate is not the protection target (NO in S140), the process returns to S130 in which server 200 further acquires information from the aforementioned or another vehicle 100 and continues comparison of the acquired information with the information about the protection target (S140).

Figure 4:
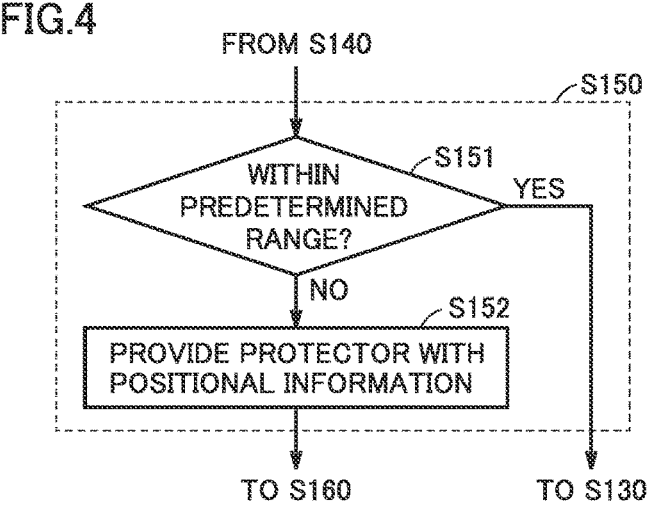
FIG. 4 is a flowchart for illustrating details of a process in step S150 in FIG. 3.

When the candidate is the protection target (YES in S140), server 200 performs a notification process for giving notification to a protector in S150. FIG. 4 is a flowchart showing an example of the notification process in S150. Referring to FIG. 4, when server 200 determines in S140 that the candidate is the protection target, server 200 determines in S151 whether the positional information on the found protection target is within a predetermined range registered in advance for the protection target. The predetermined range is determined based on the usual range of activities of the protection target. The predetermined range may be a range including the route to and from school of the protection target and its peripheral area, or a range including the house of a good friend of the protection target and its peripheral area, for example.

In such a predetermined range, there is a high possibility that the protection target is found even when protection is unnecessary. Therefore, when the position where the protection target is found is within the predetermined range (YES in S151), server 200 returns to S130 without giving notification to the protector. When the position where the protection target is found is out of the predetermined range (NO in S151), the process proceeds to S152 in which server 200 transmits, to user terminal 500 of the protector, positional information on the position where the protection target is found. Server 200 may transmit an image(s) captured when the protection target is found, together with the positional information.

In this way, it is determined whether the protection target is found within the predetermined range. Accordingly unnecessary notification to the protector can be suppressed.

When the notification that the protection target has been found is completed, the process proceeds to S160 in which server 200 determines whether server 200 has received a request to protect the found protection target, from the protector receiving the notification. When server 200 has received the request to protect from the protector (YES in S160), the process proceeds to S170 in which server 200 transmits a command to protect (request to rescue) to rescue group 400 such as a security company or a police station near the location where the protection target was found. Receiving the request to rescue, the rescue group dispatches a person in charge to the location indicated by the positional information on the protection target that is transmitted from server 200. In this way, rescue of the found protection target can be requested to the rescue group to properly protect the protection target, even under situations where the protector cannot immediately rush to the protection target.

In S170, server 200 notifies each vehicle 100 conducting the search of the information about the location where the protection target was found and the latest information about characteristics of the protection target, for example. In response, each vehicle 100 watches the found protection target (S240).

When the protector determines that protection of the protection target is unnecessary, based on information transmitted from server 200 (NO in S160), S170 is skipped and the process proceeds to S180. In S180, server 200 determines whether the user or an administrator of server 200 has instructed server 200 to end the search process. When the instruction to end the search process has not been given (NO in S180), the process proceeds to S130 in which server 200 keeps searching for and watching the protection target. When the instruction to end the search process is given (YES in S180), the process proceeds to S190 in which server 200 transmits to each vehicle a command to end the search. The command to end the search in S190 may be issued based on information indicating that protection of the protection target is completed which is given from rescue group 400.

Next, a process performed by vehicle 100 is described. While FIG. 3 shows the process performed by a single vehicle 100, the following process is performed by each of selected vehicles when server 200 selects these vehicles as vehicles which are to conduct the search.

In S200, vehicle 100 determines whether the vehicle has received from server 200 a command to search for a protection target, i.e., whether the vehicle itself has been selected as a vehicle for searching for the protection target. When the vehicle has not received from server 200 the command to search (NO in S200), the process returns to S200 and the search process is kept on standby until the command to search is given from server 200.

When the vehicle has received the command to search (YES in S200), the process proceeds to S210 in which vehicle 100 starts the search process. As described above with reference to FIG. 2, vehicle 100 determines, based on the information acquired by camera 110 and/or sensor 120, whether a person who is a candidate of the protection target has been detected (S220). According to the present embodiment, server 200 identifies the protection target, and therefore, vehicle 100 determines the candidate based on general characteristics such as the rough size (height) of the detected protection target, and the color of the clothing and/or the kinds of belongings worn by the protection target, for example.

When no candidate is detected (NO in S220), the process returns to S220 and vehicle 100 continues the search for a candidate. When the candidate is detected (YES in S220), the process proceeds to S230 in which vehicle 100 transmits to server 200 information acquired by camera 110 and/or sensor 120.

Receiving the notification that server 200 has identified the protection target based on the information from vehicle 100, vehicle 100 acquires from server 200, in S240, information about the location where the protection target was detected and information about characteristics of the protection target at the time when the protection target was detected, for example, and watches the protection target based on the acquired information. Watching of the protection target is, for example, tracking of the identified protection target by this vehicle or other vehicles around the former vehicle. Thus, the identified protection target is kept being watched and accordingly the system can be prevented from losing sight of the protection target.

Vehicle 100 thereafter determines, in S250, whether server 200 has transmitted a command to end the search for the protection target. When vehicle 100 has not received the command to end the search (NO in S250), the process returns to S240 in which the watching of the protection target is continued.

When vehicle 100 has received the command to end the search (YES in S250), the process proceeds to S260 and vehicle 100 accordingly ends the search process.

Although not shown in FIG. 3, when server 200 could not identify the protection target, vehicle 100 returns the process to S220 to continue the search for another candidate. When the protection target goes out of the field of view of camera 110 for example while the protection target is watched in S240, the process also returns to S220 and the search for the protection target is performed again.

Under control performed in accordance with the process as described above, rescue system 10 according to the first embodiment can identify a child (protection target) who is staying out, based on image information acquired by a camera mounted on a vehicle, provide notification to the protector, and rescue the protection target. Further, depending on whether the location where the protection target was found is within the usual range of activities of the protection target, the manner of giving notification to the protector can be changed so as to suppress excessive repetition of notification to the protector.

Second Embodiment

The above description of the first embodiment relates to an example in which notification is given to the protector when the location where the child who is a protection target was found is out of a predetermined range.

If the protection target is accompanied by a stranger such as a suspicious person, the protection target may need to be protected even when the location where the protection target was found is within a predetermined range. In view of this, a second embodiment employs the following scheme. Specifically, when an image captured when the protection target was found shows an accompanying person, the manner of giving notification to the protector and the manner of giving rescue are changed depending on who is the accompanying person.

Figure 5:
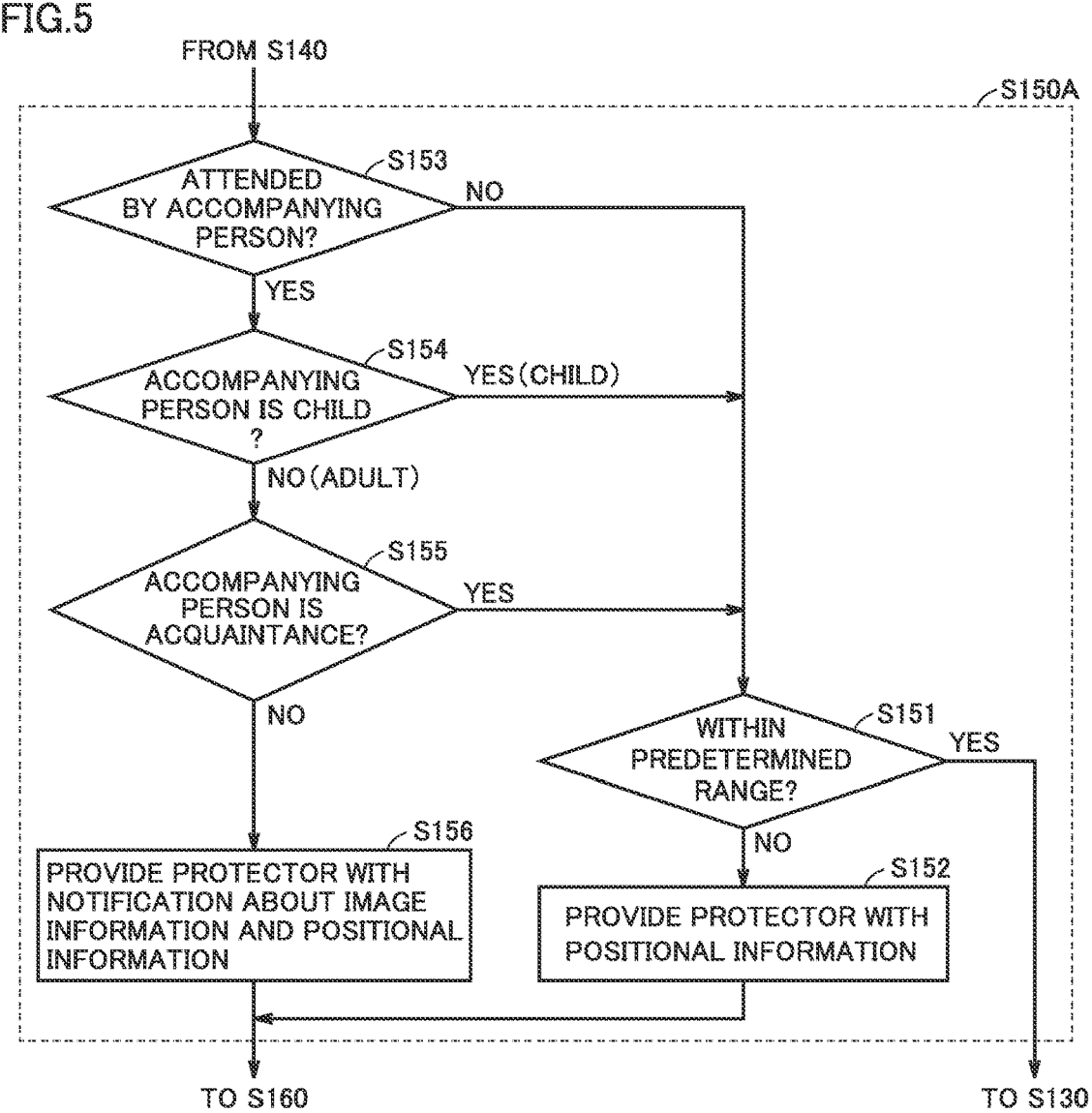
FIG. 5 is a flowchart for illustrating details of a process corresponding to step S150 in FIG. 3, according to a second embodiment.

According to the second embodiment, basically a process similar to that of the first embodiment shown in FIG. 3 is performed. The process in the second embodiment, however, differs from the first embodiment in terms of the manner of giving notification to the protector in step S150 in FIG. 3. FIG. 5 is a flowchart for illustrating a process (S150A) in the second embodiment corresponding to step S150 in FIG. 3. S150A in FIG. 5 includes S153 to S155 in addition to S151 and S152 in FIG. 4.

Referring to FIG. 5, when the protection target is identified in step S140 in FIG. 3, the process proceeds to S153 in which server 200 analyzes the image information transmitted from vehicle 100 to determine whether the identified protection target is attended by an accompanying person.

It is determined whether an accompanying person is present, based on whether another person is identified in the vicinity of the protection target in the acquired image information. When there is no accompanying person (NO in S153), the process proceeds to S151 in which server 200 gives to the protector the notification about positional information on the location where the protection target was found, when the location is out of the predetermined range (S151, S152), as described above in connection with FIG. 4.

When an accompanying person is recognized in the image information (YES in S153), the process proceeds to S154 in which server 200 determines whether the recognized accompanying person is a child. When the accompanying person is also a child like the protection target, they may be friends going out or playing together. In such a case, the necessity to protect the protection target is relatively low. Therefore, when the accompanying person is a child (YES in S154), the process proceeds to S151. Whether the accompanying person is a child or an adult can be determined from the difference in height between the accompanying person and the protection target as derived from image analysis, or characteristics of clothing and/or belongings, for example.

When the accompanying person is not a child but an adult (NO in S154), the process proceeds to S155 in which server 200 determines whether the recognized accompanying person is an acquaintance. When the accompanying person is an adult who is an acquaintance such as a relative of the protection target or a school teacher or a friend's parent, the necessity to protect may be relatively low. Therefore, when the recognized accompanying person is an acquaintance (YES in S155), server 200 proceeds to S151 to perform a similar process to that of FIG. 4.

For the determination as to whether the accompanying person is an acquaintance, characteristics derived from photographs of faces of the family, relatives, or friends for example may be registered in advance in storage unit 220 of server 200, and image information about the accompanying person may be compared with the registered information to determine whether the accompanying person is an acquaintance or not.

When the accompanying person is not an acquaintance (NO in S155), the process proceeds to S156 in which server 200 provides the protector with notification about image information acquired together with positional information on the location where the protection target was found, regardless of the location where the protection target was found. The recognized accompanying person who matches none of the persons registered in storage unit 220 is not necessarily a suspicious person. Therefore, when the accompanying person is not an acquaintance, the image information is transmitted to the protector so that the protector can confirm whether protection is necessary. In this way, unnecessary request for rescue is suppressed.

Alternatively, server 200 may use information about criminals and suspects disclosed by the police for example to determine whether the accompanying person is identified as such a criminal or suspect. In this case, if the accompanying person is identified as a criminal or suspect, early protection of the protection target is necessary. Therefore, more preferably server 200 directly requests rescue group 400 such as the police to rescue the protection target, even without request from the protector.

Under control performed in accordance with the process as described above, depending on whether an identified protection target is attended by an accompanying person and depending on who is the accompanying person, notification to the protector and rescue can be given. In this way, a child (protection target) who is staying out can be watched and protected properly.

[Modifications]

According to the above description of the first and second embodiments, a vehicle is used as movable body 100. Movable body 100, however, may represent a concept including human. For example, as the camera mounted on the movable body in the above description, a mobile terminal (smart phone or the like) having the photography function or a wearable camera which is wearable on a human body may also be used. If the movable body is a human, the movable body is not limited to those who are experts in search, but images taken by an ordinary person who is taking a stroll, jogging, or walking may be transmitted to server 200.

The control according to the embodiments described above is applicable not only children but also adult care recipients.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A rescue system for identifying and rescuing a protection target person, using information from a camera, the rescue system comprising:
   a plurality of movable bodies each equipped with a camera; and
   a server configured to communicate with the plurality of movable bodies,
   the protection target person being a child,
   the server being configured to
      identify the protection target person, using movable-body information acquired by the camera;
      determine whether or not the identified protection target person is attended by an accompanying person, based on image information included in the movable-body information;

provide a protector of the identified protection target person with notification about positional information on the identified protection target person when the identified protection target person is not attended by the accompanying person and identified at a position out of a predetermined range;

determine, when the protection target person is attended by an accompanying person, whether the accompanying person is a child; and provide the protector with the notification together with the image information on the accompanying person, regardless of the position where the protection target person is detected, when the accompanying person is an adult and does not match a person registered in advance, wherein the predetermined range is registered by the protector in advance for the protection target person and is determined based on a usual range of activities of the protection target person.

2. The rescue system according to claim 1, wherein the server is configured to request a rescue group to rescue the protection target person, when the protector instructs the server to protect the protection target person in response to the notification provided to the protector.

3. The rescue system according to claim 2, wherein the server is configured to arrange a vehicle for transporting the protection target person, in response to an instruction from the protector to transport the protection target person.

4. The rescue system according to claim 1, wherein the predetermined range is a range including a route to and from a school of the protection target person and its peripheral area, or a range including a house of an acquaintance of the protection target person and its peripheral area.

5. A server used for a system for identifying a protection target person, using information from a plurality of movable bodies each equipped with a camera, the server being configured to communicate with the plurality of movable bodies, the protection target person being a child, the server being configured to identify the protection target person, using movable-body information acquired by the camera;

determine whether or not the identified protection target person is attended by an accompanying person, based on image information included in the movable-body information;

provide a protector of the identified protection target person with notification about positional information on the identified protection target person, when the identified protection target person is not attended by the accompanying person and identified at a position out of a predetermined range;

determine, when the protection target person is attended by an accompanying person, whether the accompanying person is a child; and provide the protector with the notification together with the image information on the accompanying person, regardless of the position where the protection target person is detected, when the accompanying person is an adult and does not match a person registered in advance, wherein the predetermined range is registered by the protector in advance for the protection target person and is determined based on a usual range of activities of the protection target person.

6. The rescue system according to claim 5, wherein the predetermined range is a range including a route to and from a school of the protection target person and its peripheral area, or a range including a house of an acquaintance of the protection target person and its peripheral area.

7. A rescue method for identifying and rescuing a protection target person, by a system comprising:

a plurality of movable bodies each equipped with a camera; and a server configured to communicate with the plurality of movable bodies, the protection target person being a child, the rescue method comprising:

identifying, by the server, the protection target person using information acquired by the camera;

determining, by the server, whether or not the identified protection target person is attended by an accompanying person, based on image information included in the movable-body information;

providing a protector of the identified protection target person with notification about positional information on the identified protection target person, when the identified protection target person is not attended by the accompanying person and identified at a position out of a predetermined range, determining, when the protection target person is attended by an accompanying person, whether the accompanying person is a child; and providing the protector with the notification together with the image information on the accompanying person, regardless of the position where the protection target person is detected, when the accompanying person is an adult and does not match a person registered in advance, wherein the predetermined range is registered by the protector in advance for the protection target person and is determined based on a usual range of activities of the protection target person.

8. The rescue system according to claim 7, wherein the predetermined range is a range including a route to and from a school of the protection target person and its peripheral area, or a range including a house of an acquaintance of the protection target person and its peripheral area.

* * * * *